(12) United States Patent
Werner et al.

(10) Patent No.: US 8,666,850 B2
(45) Date of Patent: Mar. 4, 2014

(54) SYSTEMS AND METHODS FOR TRACKING INTELLECTUAL PROPERTY

(75) Inventors: Kathy L. Werner, Austin, TX (US); Henning F. Spruth, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 245 days.

(21) Appl. No.: 13/153,166

(22) Filed: Jun. 3, 2011

(65) Prior Publication Data

US 2012/0310794 A1    Dec. 6, 2012

(51) Int. Cl.
*G07B 17/00*    (2006.01)
*G07F 19/00*    (2006.01)

(52) U.S. Cl.
USPC .......................................................... 705/30

(58) Field of Classification Search
None
See application file for complete search history.

(56) References Cited

U.S. PATENT DOCUMENTS

| | | | |
|---|---|---|---|
| 7,685,545 B2 | 3/2010 | Chapman et al. | |
| 8,392,772 B2 * | 3/2013 | Burggraf et al. | 714/724 |
| 2002/0019730 A1 * | 2/2002 | Garner et al. | 703/14 |
| 2002/0150252 A1 * | 10/2002 | Wong | 380/277 |

OTHER PUBLICATIONS

SoftIP, Virtual Component Identification Soft IP Tagging Standard, Version 2.0 dated Sep. 2006, 31 pages, downloaded from http://www.vsi.org/docs/IPPTagStndSoft_14Sep06.pdf.*
HardIP, Virtual Component Identification Physical Tagging Standard, Version 3.0 dated Jun. 2006, 13 pages, downloaded from http://www.vsi.org/docs/IPP_Tagging_Std 201_30.pdf.*
NPL_Accellera, News about IP Tagging Effort, downloaded from http://www.accellera.org/news/pr/view?item_key=0674b78c0af0bb2adeb9c37b4b5d0850d9b49da6 on Aug. 8, 2013, 2 pages.*
VSI Alliance, Intellectual Property Protection Development Working Group, Virtual Component Identification Soft IP Tagging Standard, Version 2.0, IPP 4 2.0), Released Sep. 2006.
Accellera, IP Solutions, "Accellera Calls for IP Tagging Effort, Calls for Participation", EE Catalog, Apr. 27, 2011, http://www.accellera.org/home.

* cited by examiner

*Primary Examiner* — Paul Danneman
(74) *Attorney, Agent, or Firm* — Mary Jo Bertani

(57) ABSTRACT

Systems and methods are provides that access a tag cell file in computer storage media, wherein the tag cell file is associated with a abstract representation of a component to be included in a semiconductor device. The tag cell file includes a tag that identifies the component as being based on intellectual property of a third party. The abstract representation of the component is translated to a computer data file for manufacturing the semiconductor device. The tag associated with the component is included in the data file, and the data file may be parsed by accounting programs to determine the extent of usage of the intellectual property in the semiconductor device.

20 Claims, 3 Drawing Sheets

```
// DO NOT REMOVE THE FOLLOWING INSTANCE!
// This is an instance of a technology-independent id cell which is used
// to track usage of this soft IP. You can find design views
// for this cell (Liberty, LEF, GDS etc.) in the same block directory
// as this RTL code. You must include this cell throughout your implementation
// flow to avoid the risk of incurring legal consequences.
LEGALLY_REQUIRED_DO_NOT_REMOVE_ACME_parity_counter_1 idcell_instance () ;
```

202 brackets the comment block; 204 brackets the instance line; figure numbered 200.

FIG. 2

Liberty:
```
library (LEGALLY_REQUIRED_DO_NOT_REMOVE_ACME_parity_counter_1) {
  cell (LEGALLY_REQUIRED_DO_NOT_REMOVE_ACME_parity_counter_1) {
    dont_use : true;
    dont_touch : true;
  }
}
```

FIG. 3

LEF:
```
MACRO LEGALLY_REQUIRED_DO_NOT_REMOVE_ACME_parity_counter_1
  CLASS COVER ;
  SIZE 0.01 BY 0.01 ;
END LEGALLY_REQUIRED_DO_NOT_REMOVE_ACME_parity_counter_1
```

FIG. 4

Verilog:
```
Module LEGALLY_REQUIRED_DO_NOT_REMOVE_ACME_parity_counter_1 () ;
endmodule
```

FIG. 5

SYSTEMS AND METHODS FOR TRACKING INTELLECTUAL PROPERTY

BACKGROUND

1. Field

This disclosure relates generally to semiconductor device design management, and more specifically, to tracking intellectual property used in a semiconductor device.

2. Related Art

Semiconductor devices such as integrated circuits and printed circuit boards often perform several different functions to process data and interface with external components. To reduce risks and save development time and costs, many functions common to semiconductor devices can be implemented using modular off-the-shelf designs from a third party vendor. Such functions can include, for example, audio codecs, data converters, touch screen controllers, video signal processing, logic cells, infrastructure components, and standard interfaces for USB, PCIe, DDR, SATA, HDMI, Ethernet and MIPI. The modules are often protected under intellectual property laws such as patents and copyrights, and the semiconductor manufacturers agree to license the intellectual property (IP) in exchange for the right to make and sell products that embody the IP.

The design process often includes generating and testing a software model of the semiconductor device using Electronic Design Automation (EDA) tools. The EDA tools allow designers to prepare various views of components and interconnections between components that are included in the device such as a netlist or schematic view and a layout view. Suppliers of the soft IP that is being used in the device typically provide models of components describing the IP. The models are typically provided in Register Transfer Level (RTL) files or other suitable representation that can be used in the EDA tools and are referred to as "soft IP." Once the simulated model of the design is tested, the contents of the soft IP files as well as files for other components in the design are converted to a gate-level description of the circuit(s). Placement and routing tools can be used on the gate-level descriptions to create a physical layout. The layout can be converted and stored in a format that is used by semiconductor foundries to manufacture the devices according to specifications. Examples of formats used by semiconductor foundries include the Graphic Data file System II (GDS II) format and the Open Artwork System Interchange Standard (OASIS) format.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 2 is an example of a tag cell that can be used to track soft intellectual property (IP) assets in accordance with the present invention.

FIG. 3 is an example of a library file for the tag cell in Synopsis Liberty format that can be used to track soft intellectual property (IP) assets in accordance with the present invention.

FIG. 4 is an example of a view file for the tag cell in .LEF format that can be used to track soft intellectual property (IP) assets in accordance with the present invention.

FIG. 5 is an example of a view file for the tag cell in Verilog format that can be used to track soft intellectual property (IP) assets in accordance with the present invention.

DETAILED DESCRIPTION

Embodiments of systems and methods disclosed herein instantiate tagging information in a cell file that is included with one or more files associated with a soft intellectual property (IP) component. Corresponding views are created to automate the flow of tagging information from RTL to a data file or other suitable type of design file that identifies the soft IP components in a design. The design files are provided to manufacturers thereby enabling data driven tracking of usage, ownership and royalties of the soft IP.

A Virtual Component Identification Soft IP Tagging Standard (Version 2.0) was developed by the VSI Alliance to track the flow of Register Transfer Level (RTL) files or other suitable representation through EDA tools, but none of the EDA tools support the standard. Systems and methods disclosed herein concisely implement tagging fields that are detectable and trackable throughout the design flow without requiring any changes from the provider of the soft IP or EDA tools. Soft IP provided by third parties as well as soft IP developed internally that is used to design and implement a product can be tagged for detection and tracking in information, such as GDS tapeouts, provided to manufacturers. Copies of the manufacturing information can be retained to account for use of the soft IP as well as to track versions of the soft IP in products.

Note that although RTL files and GDS data files are used herein as examples, embodiments of the systems and methods disclosed herein can be adapted to any type of representations for soft and hard IP assets or components for products and/or services in any industry.

Figure 1:
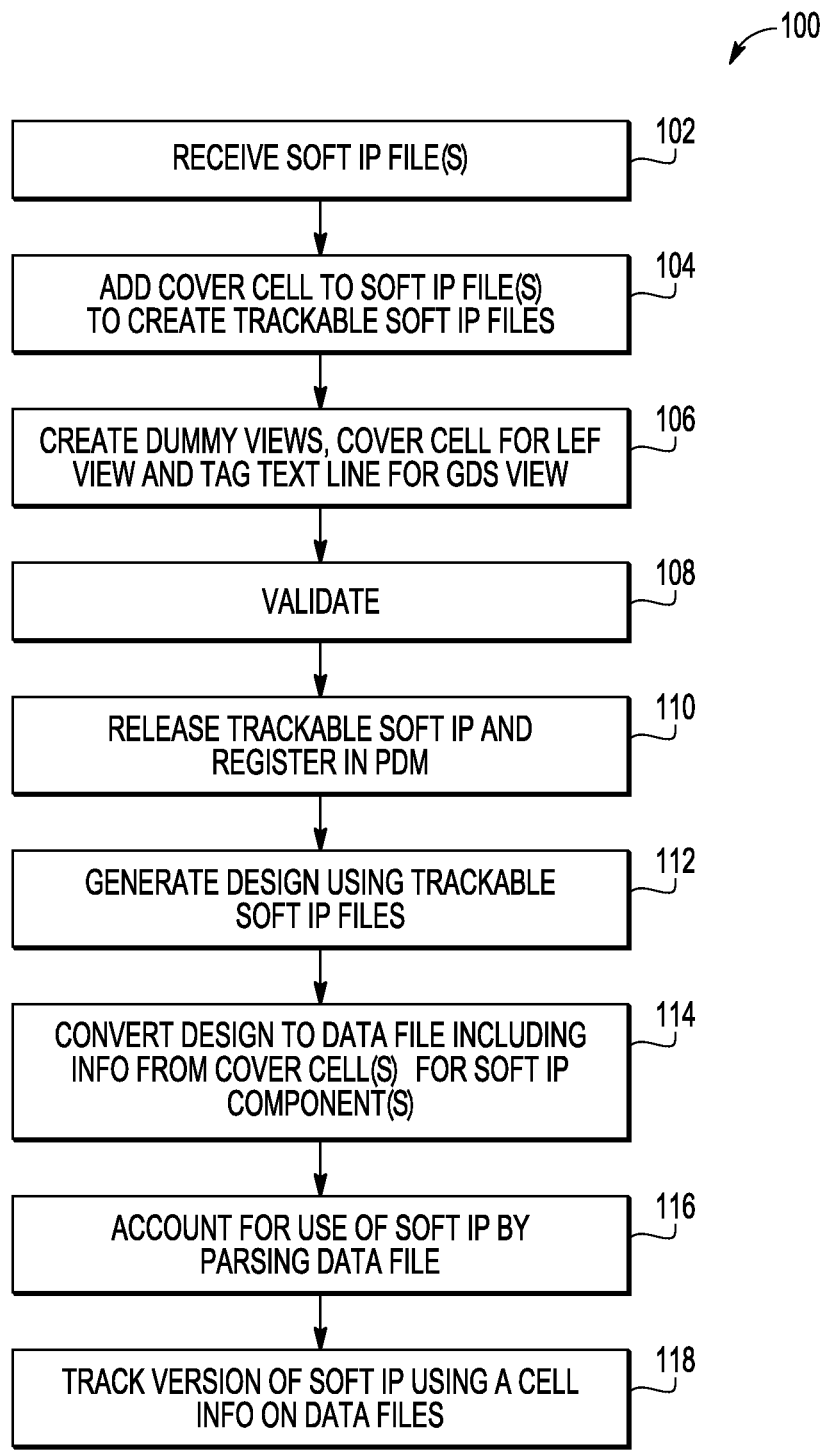
FIG. 1 is a flow diagram of an embodiment of a method for tracking soft IP assets in accordance with the present invention.

Referring to FIG. 1, a flow diagram of an embodiment of a method 100 for tracking soft IP assets or components in accordance with the present invention is shown.

Process 102 can include receiving one or more cell files that include information for one or more soft IP components from either a third party or from an internal source. For example, the files may be RTL files that embody specifications for components to be used in a semiconductor device such as an analog to digital converter (ADC). An ADC may include a number of interconnected structures that provide a Boolean logic function such as flip-flops, AND, OR, XOR, XNOR, and inverters.

Process 104 can include instantiating a new tag cell in the RTL files for the component. An embodiment of an RTL tag cell 200 is shown in FIG. 2 including a comment section 202 and tag instantiation line 204. Comment section 202 can include information regarding the use of the tag cell 200 and other design views that have been created to accompany tag cell 200. The comment section 202 may also warn users not to remove the tag cell 202 from the library or to modify tag instantiation line 204. The comment section 202 and/or tag instantiation line can further include an indication of a legal requirement to include the tag cell with the representation of the component.

Tag instantiation line 204 can also specify any relevant information such as a vendor or supplier of the soft IP, the name or other identifier of the component, and a version level of the component.

View files such as .rtl, .lib, and .sdf view files can be created in process 106. Process 106 can also include generating a cover cell to be used for the .LEF view. The cover cell is a .LEF macro that allows the tag information to propagate to the GDS. Process 106 can include creating a .LEF view of a cover macro that includes the tags associated with the IP being tracked. The cover cell can be defined with zero area dimensions which allows the text tags to be carried into the GDS without impacting the size of the semiconductor device.

FIG. 3 is an example of a library file 300 for the tag cell in Synopsis Liberty format that can be used to track soft intellectual property (IP) assets in accordance with the present invention. Library file 300 includes library statement and a cell statement that include a legal requirements notice and an identifier and version number of the component. Library file 300 also includes dont_use and dont_touch statements set to "true".

FIG. 4 is an example of a view file 400 for the tag cell in .LEF format that can be used to track soft intellectual property (IP) assets in accordance with the present invention. View file 400 includes a MACRO statement with a name that includes a legal requirements notice and an identifier and version number of the component. View file 300 also includes a CLASS COVER statement, a SIZE 0.01 BY 0.01 statement, and an END statement with the name of the macro.

FIG. 5 is an example of a view file 500 for the tag cell in Verilog format that can be used to track soft intellectual property (IP) assets in accordance with the present invention. View file 500 includes Module statement with a name that includes a legal requirements notice and an identifier and version number of the component as well as and an endmodule statement.

Note that library files 300 and view files 400 and 500 in FIGS. 3-5 are provided as examples only. Other view files, library files, and cell files that support tracking of the soft IP using tag cell files can be used in addition to or instead of library files 300 and view files 400 and 500.

The tag cell file and corresponding view files (e.g. Jib, .sdf) can be provided by the party supplying the soft IP or added by the recipient of the soft IP if the tag cell files are not included in the files provided by the supplier of the soft IP. The cells and views can be created using scripts. For example, the scripts can create verilog, GDS, LEF and liberty views of the tag cell library. The script can also modify a provided topcell soft IP RTL file by adding an instance of the tag cell inside the top module that will be used to trace where the soft IP is used in designs.

Process 108 can include validating the soft IP. Validation can include running verification test benches on the original and tagged versions of the IP to ensure that there is no functional or timing differences, and/or running a logical equivalency check (LEC) on the post-synthesized, gate level views.

Process 110 can include releasing the trackable soft IP files including the tag cell and various views of the tag cell for use by designers in a company or other organization. The trackable soft IP files may be stored in a central repository, and copies of the soft IP may be checked out or copied by a designer. The tags can be used to generate a list of revision levels acceptable for use in a semiconductor device. Controls can be implemented to prevent users from accessing versions of the soft IP that are no longer being used in new designs. A copy of the trackable version of the soft IP can also be provided to the party that provided the original soft IP so that the supplier can verify that a tag cell file has been incorporated in the soft IP or other purposes.

Process 112 can include using the trackable soft IP files during the design of a semiconductor device using Electronic Design Automation (EDA) tools. The tag cell and corresponding view files do not add functionality to the design or cause any operational overhead on the semiconductor device. Additionally, the tag cell files and corresponding view files can be instantiated and used without requiring updates or changes to existing EDA tools or design flow.

Process 114 can include generating a GDS data file for the design from the trackable soft IP files along with the files for any other components in the design that are not licensed from another party or for which use of the component does not have to be accounted. The GDS data file will include one instance of the tag information each time the corresponding component appears in the design. As an example, tag text on layer 63:63 of the GDS view can be viewed when the design files are converted to GDS. The GDS data files are also supplied to manufacturers of the semiconductor device.

Process 116 can include accounting for use of the soft IP by parsing the GDS data file for soft IP tag information. Process 116 can also generate a report of soft IP usage that is sorted by provider, number of times each soft IP component is used in a particular device, the royalty rate or other payment basis, a total sum due to the provider, and other relevant accounting information.

Process 118 can include tracking versions of the soft IP in products to allow manufacturers to send revisions, updates, and/or any other purpose that tracking versions of soft IP can be used. The tag cell, corresponding view files, and design manufacturing data files containing the tag information for each use of soft IP components allow use of the soft IP to be tracked seamlessly throughout a design implementation flow and manufacture of the semiconductor device.

Figure 6:
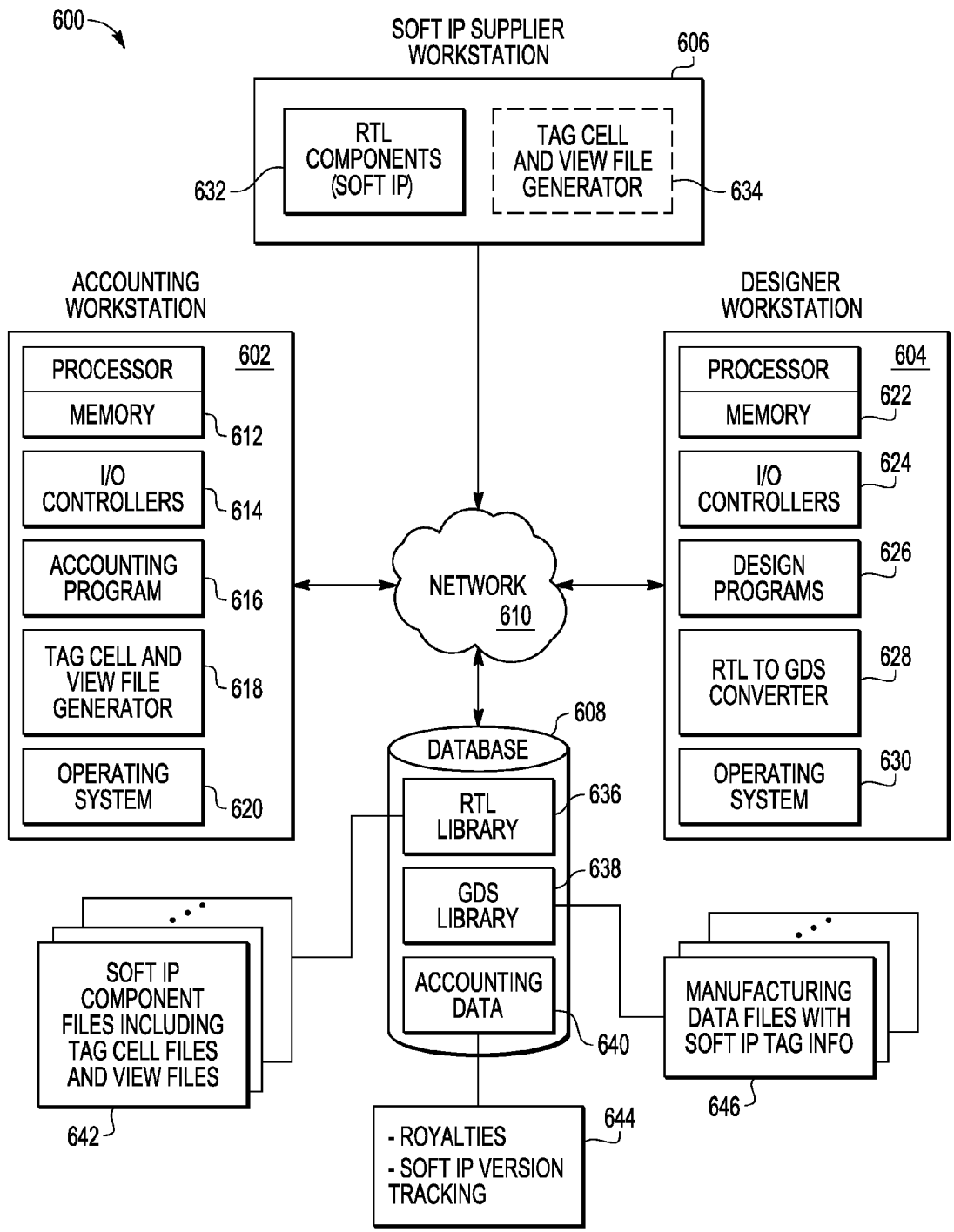
FIG. 6 is a block diagram of an embodiment of a computer system that can be used to track soft intellectual property (IP) assets in accordance with the present invention.

FIG. 6 is a block diagram of an embodiment of a computer system 600 that can be used to perform method 100 (FIG. 1) and implement the tag cell file of FIG. 2 and corresponding view files to track soft intellectual property (IP) assets in accordance with the present invention. Computer system 600 can include accounting workstation 602, designer workstation 604, third party workstation or data server 606, and database or data repository 608 configured to communicate with each other via network 610. Components of workstations 602, 604, 606 and data repository 608 can communicate internally through one or more data busses such as peripheral component interconnect (PCI) buses, industrial standard architecture (ISA) buses, and/or other suitable buses.

Accounting workstation can include central processing unit (CPU) and main memory unit 612, input/output (I/O) controllers 614, accounting programs 610, tag cell and view files generator 618, and operating system 620.

Designer workstation 604 can include central processing unit (CPU) and main memory unit 622, input/output (I/O) controllers 624, design programs 626, RTL to GDS converter 628, and operating system 630. Design programs 626 can access a representation of a component for a semiconductor device. The representation can be one or more RTL cell files, tag cell files, view files, and/or other suitable types of files. The representation can be implemented as a file on computer storage media that specifies intellectual property information regarding whether the component is subject to a license from a third party. The design programs 626 can use the abstract representation to design and test the semiconductor device. The tag cell file(s) remains with the component throughout the design flow even though the tag cell file does not add any functionality to the resulting semiconductor device. RTL to GDS converter 628 converts the abstract representation to a data format that is used or required by a manufacturer to produce the semiconductor device. The data includes the intellectual property information from the tag cell files for all the components being tracked.

Third party workstation or data server 606 can include RTL components (soft IP) 632, and also other components not shown such as a central processing unit (CPU) and main memory unit, input/output (I/O) controllers, authentication and access control programs, and an operating system.

Data repository 608 includes computer memory/storage devices to store soft IP components 642 and such as RTL files, tag cell files and corresponding view files, accounting data files such as royalty information and version tracking files 644, and manufacturing data files with soft IP tag information 646. Data repository 608 can be coupled to a workstation or server (not shown) that includes a central processing unit (CPU) and main memory unit, input/output (I/O) controllers, authentication and access control programs, and an operating system. Data repository 608 may be implemented using hard disk drives, tape drives, magneto-optical disk drives, CD-ROMs, CD-Rs, CD-RWs, DVD-ROMs, DVD-Rs, DVD-RAMs, and other suitable devices.

Accounting programs 610 account for use of the soft IP by parsing the GDS data file for soft IP tag information. Accounting programs 610 can generate a report of soft IP usage that includes information such as the soft IP provider, number of times each soft IP component is used, the royalty rate or other payment basis, a total sum due to the provider, and other relevant accounting information. Accounting programs 610 can further track versions of the soft IP in products to allow manufacturers to send revisions, updates, and/or any other purpose that tracking versions of soft IP can be used.

Design programs 626 are Electronic Design Automation (EDA) programs and other application programs that aid users in designing and simulating/testing semiconductor devices. Examples of design programs 626 that are commercially available include the Allegro and OrCAD, and PSpice suites of tools from Cadence Design Systems in San Jose, Calif.

RTL to GDS converter 628 can generate a GDS data file for the design from the trackable soft IP files along with the files for any other components in the design that are not licensed from another party or for which use of the component does not have to be accounted. The GDS data file can include one instance of the tag information each time the corresponding component appears in the design. The GDS data files are also supplied to manufacturers of the semiconductor device.

RTL library 616 can include files containing representations of a collection of low-level logic functions such as AND, OR, INVERT, flip-flops, latches, and buffers, as well as more complex components. RTL library 616 can include a library data file of a number of views often including layout, schematic, symbol, abstract, and other logical or simulation views. From this, various information may be captured in a number of formats including the Cadence LEF format, and the Synopsys Milkyway format, for automated place and route tools. The RTL library file can also include timing abstracts that provide functional definitions, timing, power, and noise information for each cell, a full layout of the cells, Verilog or VHDL models of the cells, parasitic extraction models, and design rule checking decks. Tag cell files and view files for trackable soft IP component files 642 can specify a vendor, the component, and a version of the component. The tag information can also include an indication of a legal requirement to include the license information with the representation of the component. One instance of the license information per instance of the representation of the component is included in the data format.

Network 610 can be a local area network, wide area network, peer-to-peer network, and/or a worldwide information network such as the Internet.

I/O controllers 614, 624 to control a pointing device such as a keyboard, mouse, touch pad, and/or trackball, and/or other suitable I/O device. CPU 602 can output information to be presented to a user via a display device (not shown) through display controller.

FIG. 6 is intended as an example and not as a structural limitation of embodiments of the present invention.

By now it should be apparent that embodiments of systems and methods disclosed herein can enable tracking and management of soft IP such as components for which royalties are owed to the third party, and/or for which it is desired to track usage of the component in products or services supplied by the recipient or licensee. A representation of a component for a semiconductor device is accessed. The representation includes a file that specifies intellectual property (IP) information regarding whether the component is subject to a license from a third party. For example, a dummy cell file that specifies the supplier and the name and version of the component, is added to the files included with the component. The dummy cell file is usable in electronic design automation tools (EDA) for semiconductor devices without requiring any changes to the EDA tools or design flow, and without adding any functionality or requiring any physical layout area on the resulting semiconductor device. The abstract representation can be converted to a data format that is required by a manufacturer to produce the semiconductor device. The data includes the soft IP information and can be tracked for various purposes, including determining royalty payments and tracking/managing version levels of various components.

The terms "software" and "program," as used herein, are defined as a sequence of instructions designed for execution on a computer system. Software, a program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 6 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 600, for example, from computer readable media such as memory or other media on other computer systems. Such computer readable media may be permanently, removably or remotely coupled to an information processing system such as system 600. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, workstations 602, 604, 606 and data repository 608 include computer systems such as a server or a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process. An operating system control operation of the CPU and main memory units as well as application programs.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
providing a tag cell file in computer storage media, wherein the tag cell file is associated with a cell file that includes an abstract representation of a component to be included in a semiconductor device, and the tag cell file includes a tag cell instantiation line that-instantiates a tag cell for the component and identifies the component as being based on intellectual property of a third party;
providing one or more view files for the tag cell file and the cell file, wherein the view files are configured to be used in an Electronic Design Automation (EDA) tool to design and test semiconductor devices.

2. The method of claim 1 further comprising:
parsing the data file for instances of the tag to account for use of the component in determining royalty payments due to the third party.

3. The method of claim 1 further comprising:
using the tag to track inclusion of the component in the semiconductor device.

4. The method of claim 1 wherein the tag includes a revision level of the component, the method further comprising:
using the tag to generate a list of revision levels acceptable for use in the semiconductor device.

5. The method of claim 1 wherein the tag specifies a vendor, the component, and a version of the component.

6. The method of claim 1 wherein the data file includes one instance of the tag cell per one instance of the abstract representation of the component.

7. The method of claim 1 wherein the tag includes an indication of a legal requirement to include the tag cell with the representation of the component.

8. The method of claim 1 further comprising:
supplying the data file to a manufacturer of the semiconductor device.

9. The method of claim 1 further comprising:
including the tag cell file throughout a design implementation flow of the semiconductor device.

10. The method of claim 1 wherein the tag cell file is one of the group consisting of: supplied by the third party and added by a user of the intellectual property.

11. A computer processing system comprising:
  logic instructions implemented on a non-transitory computer readable storage media operable to:
    access a cell file that includes a representation of a component for a semiconductor device, wherein the representation includes a tag cell file on computer storage media that specifies intellectual property information regarding whether the component is subject to a license from a third party and the tag cell file further includes a tag instantiation line to instantiate a tag cell for the intellectual property information;
    use the abstract representation to design and test the semiconductor device; and
    convert the abstract representation to a data format that is required by a manufacturer to produce the semiconductor device, wherein the converted abstract representation includes the intellectual property information.

12. The computer processing system of claim 11 wherein the license information specifies a vendor, the component, and a version of the component.

13. The computer processing system of claim 11 wherein one instance of the license information per instance of the representation of the component is included in the converted abstract representation.

14. The computer processing system of claim 11 wherein the license information includes an indication of a legal requirement to include the license information with the representation of the component.

15. A method comprising:
  accessing a cell file that includes an abstract representation of a component for a semiconductor device;
  accessing a tag cell file on computer storage media that specifies intellectual property (IP) information regarding whether the component is subject to a license from a third party;
  using view files of the cell file and the tag cell file in an electronic design automation tool for semiconductor devices; and
  converting the abstract representation to a data format that is required by a manufacturer to produce a semiconductor device, wherein the converting includes accessing a cover cell that includes a macro to propagate the IP information to the data format required by the manufacturer and the converted abstract representation includes the IP information.

16. The method of claim 15 wherein the representation is in register transfer level, the file is a tag cell file in the register transfer level, and the IP information is included in an instantiation line in the tag cell file.

17. The method of claim 16 further comprising:
  parsing the converted abstract representation for instances of the tag to account for use of the component to determine royalty payments due to the third party.

18. The method of claim 16 further comprising:
  using the tag to track inclusion of the component in the semiconductor device.

19. The method of claim 15 wherein the IP information includes a revision level of the component, the method further comprising:
  using the IP information to generate a list of revision levels acceptable for use in the semiconductor device.

20. The method of claim 15 wherein the IP information is one of a group consisting of: supplied by the third party and added by a user of the intellectual property.

* * * * *